United States Patent [19]

Hiralal

[11] Patent Number: 5,690,700
[45] Date of Patent: Nov. 25, 1997

[54] PROCESS FOR THE PRECIPITATION OF ALUMINUM TRIHYDROXIDE FROM A SUPERSATURATED SODIUM ALUMINATE SOLUTION

[75] Inventor: Iwan Dilip Kumar Hiralal, Leidschendam, Netherlands

[73] Assignee: Billiton Intellectual Property B.V., Netherlands

[21] Appl. No.: 563,384

[22] Filed: Nov. 28, 1995

[30] Foreign Application Priority Data

Nov. 30, 1994 [EP] European Pat. Off. ............ 94203488

[51] Int. Cl.$^6$ .............................................. C01F 7/14
[52] U.S. Cl. ..................... 23/301; 23/305 A; 423/629; 423/127
[58] Field of Search .................... 423/629, 121, 423/127; 23/301, 305 A

[56] References Cited

U.S. PATENT DOCUMENTS

| | | | |
|---|---|---|---|
| 2,347,073 | 4/1944 | Beekhuis, Jr. | 23/301 R |
| 2,707,669 | 5/1955 | Houston et al. | 423/630 |
| 2,935,376 | 5/1960 | Roberts, Jr. | 23/301 |
| 3,265,466 | 8/1966 | Mollard | 23/301 |
| 3,486,850 | 12/1969 | Day | 423/127 |
| 3,906,084 | 9/1975 | Gnyra | 423/629 |
| 4,150,952 | 4/1979 | Lafleur et al. | 23/301 |
| 4,234,559 | 11/1980 | Tschamper | 423/629 |
| 4,305,913 | 12/1981 | Anjier | 23/301 |
| 4,311,486 | 1/1982 | Yamada et al. | 23/301 |
| 4,364,919 | 12/1982 | Yamada et al. | 423/629 |
| 4,511,542 | 4/1985 | Anjier et al. | 23/301 |
| 4,530,699 | 7/1985 | Schlesinger et al. | 23/301 |
| 4,617,179 | 10/1986 | Veyrier | 23/301 |
| 5,102,426 | 4/1992 | Hiscox et al. | 23/305 A |
| 5,529,761 | 6/1996 | Brown et al. | 423/121 |

Primary Examiner—Ngoc-Yen Nguyen

[57] ABSTRACT

A process for the precipitation of aluminum trihydroxide from a supersaturated sodium aluminate solution, comprising the steps of (a) supplying a stream of supersaturated sodium aluminate solution and a first stream of aluminum trihydroxide particles as seed particles to a first reaction circuit, (b) maintaining the sodium aluminate stream containing the stream of seed particles in the first reaction circuit under conditions mainly resulting in precipitation and agglomeration of aluminum trihydroxide, (c) passing the stream thus obtained to a second reaction circuit in which the stream is maintained under conditions mainly resulting in precipitation and growth of aluminum trihydroxide particles, (d) passing the stream obtained in the second reaction circuit to a separation/classification unit to separate the stream into a first aluminum trihydroxide product stream comprising the coarser particle size portion, a second aluminum trihydroxide product stream comprising the finer particle size portion and a spent liquor stream, (e) supplying a second stream of aluminum trihydroxide particles to spent liquor and dissolving at least part of the aluminum trihydroxide in the spent liquor and introducing the stream thus obtained into the sodium aluminate solution containing the first fraction of aluminum trihydroxide particles in the first reaction circuit.

9 Claims, 1 Drawing Sheet

PROCESS FOR THE PRECIPITATION OF ALUMINUM TRIHYDROXIDE FROM A SUPERSATURATED SODIUM ALUMINATE SOLUTION

BACKGROUND OF THE INVENTION

The present invention relates to a process for the precipitation of aluminum trihydroxide from a supersaturated sodium aluminate solution, especially the precipitation of aluminum trihydroxide from Bayer process liquor.

Various attempts have been made in the past to increase the yield and particle size of the aluminum trihydroxide recovered from Bayer process liquors.

Recent attempts at improvements have included modifying various aspects of the process including improved precipitation by directing the incoming pregnant liquor stream into a first series of tanks known as the agglomeration section, followed by directing the slurry thus obtained to a second series of tanks known as the growth section. Further improvements and changes have been described in for instance U.S. Pat. Nos. 2,707,669, 4,234,559, 4,305,913, 4,311,486, 4,364,919, 4,617,179, 5,102,426 and French patent FR 1,391,596.

The basic principles of the Bayer process have not changed in the more than 100 years which have elapsed since the original patent was granted. In a typical example the following operations are performed in turn: (1) dissolution of the alumina at a high temperature; (2) separation and washing of insoluble impurities of bauxite (red muds) to recover the soluble alumina and caustic soda; (3) partial hydrolysis of sodium aluminate at a lower temperature to precipitate aluminum trihydroxide; (4) regeneration of the solutions for reuse by evaporation of the water introduced by the washing; and (5) calcination of the aluminum trihydroxide to anhydrous alumina.

The term "pregnant liquor" means a highly supersaturated solution of alumina dissolved in sodium hydroxide. It has been filtered to remove solid inerts and impurities.

The term "caustic concentration" means the concentration of total sodium hydroxide in the solution in grams/liter, expressed as equivalent $Na_2CO_3$.

The term "seed" means relatively small aluminum trihydroxide crystals, which serve for the agglomeration section, upon which the dissolved alumina can precipitate. The term "ratio" is the ratio of dissolved alumina expressed as g/L $Al_2O_3$:total caustic as g/L NaOH, but expressed in equivalent g/L $Na_2CO_3$.

After separation of the pregnant liquor from the insoluble residues present in the bauxite, the pregnant liquor is cooled in preparation for precipitating their aluminum trihydroxide content. To induce precipitation, aluminate liquor is seeded with seed obtained from previously precipitated crystals, and the mixture is agitated. The seed grows to an acceptable size and is then separated from the liquor. Usually the process comprises a first agglomeration step, followed by a second growth step. The aluminum trihydroxide from precipitation is filtered and washed, and the alumina is now ready to undergo calcination. Calcination changes the composition and crystalline structure of the alumina without changing particle shape.

European and American plants employ slightly different variations of the Bayer process. European plants use much higher caustic concentrations for digestion of bauxite ore. This more concentrated liquor requires less energy per unit volume of liquor circulated.

In the American process, use of a more dilute caustic solution results in production of larger particles, although at a somewhat lower yield.

The Bayer process as practised in Europe and the United States has evolved over the years to satisfy the demands made by the continuous and ongoing development of the process. These demands now include:

1. High yield from the process liquor, to minimize the energy requirements of the process, and to maximize the production rate from existing facilities. In practice this implies precipitation from a caustic solution having a caustic concentration higher than previously considered normal for North American Bayer circuits —typically 150–200 gpl NaOH caustic expressed as $Na_2CO_3$—now 200–300 gpl.
2. Production of a coarse granular product, to minimize dusting and facilitate handling in subsequent phases of metal production—typically less than 10%–45 micron.
3. Production of a crystal with a morphology which is resistant to breakdown during and after rough treatment in modern fluid flash calciners. Typically a breakdown of less than 4%–45 micron during calcination, and an Attrition Index of less than 20 after calcination, are required.
4. Production of a material with a low total soda content, to match the low losses from modern dry-scrubbed long-life cells in the smelters, and to avoid excess bath generation. Typically, values of less than 0.4% $Na_2O$ (calcined basis) are now required.

The precipitation circuit usually comprises a first reaction circuit (agglomeration stage) and a second reaction circuit (growth stage).

In a typical example, the precipitation circuit includes a chain of up to 20, for example 10–15 tanks or vessels, also called precipitators. The tanks include two sizes. Usually 2–4 smaller tanks each of for example 1000 $m^3$ capacity to provide a residence time of 2 hours comprise the agglomeration stage of the precipitation circuit; the remaining tanks, comprising the growth stage, may each have a capacity of for example 4000 $m^3$ or more, to provide a residence time of 4 hours. All these tanks or vessels are often provided with agitators of generally conventional character, to effect the requisite agitation of the liquor during the precipitation operation. The larger (growth stage) tanks may be fitted with weirs to skim liquor from the top surface of the contents of the tank and cooling devices to remove heat from the contents.

The incoming pregnant liquor preferably has a temperature of between 65° C. and 90° C., for example 70° C. and 85° C., with the typical temperature being about 75° C. The pregnant liquor usually has a concentration of 100 grams/liter to 400 grams/liter, for example 150 grams/liter to 300 grams/liter of total caustic and a ratio of 0.5 to 0.8, for example 0.6 to 0.75 of dissolved alumina to total caustic. Cooling of the incoming pregnant liquor may be accomplished in the plant heat exchange network prior to its admission to the precipitation section.

As indicated above, alumina production capacity can be increased by operating the Bayer liquor cycle at higher caustic soda concentrations. Plant experience however reveals that there is a conflict of objectives in the precipitation process. The operating conditions for achieving the highest yield are often adverse to meeting other objectives, such as the structure, shape, particle size distribution and toughness of the hydrate particles and maintaining a seed balance.

An important prerequisite to be successful in the high yield mode of operation is to have ample agglomeration power in the precipitation circuit to sustain product quality and seed balance by consuming the higher amount of fines which is inherent in maximum yield mode of operation.

Particle size distribution control and particle population balance are the most important, difficult to predict, and poor understood aspects of the precipitation process. The number of particles formed by nucleation and breakage must equal the number of particles removed from the system by agglomeration and/or growth into product, or by dissolution. The operating conditions for achieving the highest yield are often adverse to meeting other objectives, such as product particle size, chemical purity and seed balance.

The general approach in precipitation product quality control is to produce a coarse, agglomerated but strong hydrate which does not contain fines and also does not break down in the calciner. Several precipitation flowsheets, some simple and some fairly complicated, are being practised to meet this goal. A common feature of these systems is an agglomeration stage where precipitation conditions conductive to agglomeration are maintained. This is then followed by a toughening stage where the agglomerates are hardened by further deposition of hydrate. The hydrate classification system also plays an important role in yielding a coarse product. Hydro cyclones and other hydraulic classification devices are being employed to improve classification over that achieved in primary and secondary settling tanks.

Because of fluctuations of the process parameters originating outside as well as in the precipitation department there is often an imbalance in seed generation and seed requirement. Shortage or excess seed are both undesired because both hamper the operating stability and thus the production capacity of the precipitation circuit.

The conventional method to control the seed balance is by changing the agglomeration ability in the first precipitator tank.

Factors influencing the agglomeration power are known to be:

a) solids concentration and particle size distribution in the first precipitator.
b) temperature in this precipitator.
c) agitation.
d) degree of supersaturation and retention time of the liquor in the precipitator.
f) impurities, seed activity, morphology of the solids, etc.

The objective is to produce a proper agglomerate by applying the right conditions in the first stage of the precipitation process, the agglomeration step. The proper agglomerate crystal is a composite of very small single crystals cemented together by precipitated alumina trihydrate to give a spherical particle ideally.

At the other hand process variables should be kept such that the generation of mono crystals and aggregates are prevented. An aggregate crystal is similar to the agglomerate except that fewer and larger crystals make up the particle. The surface of the particle is therefore more rugged. This along with the mono crystals will yield shattering of the particles and chipping of the rugged edges in the calciner resulting in excessive fines.

In case of excess fine seed inventory the seed balance is regained by:

increasing the first tank temperature.
calcination of the seed and produce an off spec product temporarily.
reducing the first tank holding time.
storing the excess fine seed temporarily.

In case of shortage of fine seed the seed stock is regained by:

reduction in the first tank temperature.
coarse seed is supplemented in the first precipitator tank.

Most of the time a situation of excess fine seed will occur because most of the measures taken to maximize production are conflicting with the production of a coarse product.

Various parameters are used in precipitation to control the quality of the hydrate and alumina. Following is a short description of the most frequently used variables (A–D) in the alumina industry to control the quality of the precipitated aluminum trihydrate.

A. Temperature

The temperature in the agglomeration section is usually kept at a fixed level and is not altered unless there is a major process upset, for example the formation of oxalate crystals. In that case the temperature usually will be increased.

The temperature in the agglomeration section may also be increased in case of excess seed to enhance the agglomeration of fine particles into product size hydrate. In case of low seed inventory the temperature in the agglomeration section may be lowered to generate more fines by enhancing nucleation. Reason for temperature adjustment can be dictated by the level of occluded soda in the product hydrate. An increase in temperature has the effect of lowering the occluded soda while the reverse effect is observed when the temperature is reduced. In general the temperature will be brought back gradually to the original level after the problem is corrected.

B. Seedcharge

Seedcharge may be used in several ways to control the product particle size distribution and occluded soda. Lowering the fine seed to the agglomeration section has the effect of increasing the agglomeration of the fine particles while the opposite is the case at increased seed charge. The occluded soda in the hydrate can also be reduced by increasing the seed charge to the agglomeration section. The mechanism in this case causing the effects is probably the precipitation rate which is lowered at increased seed charge because of the increase in surface area exposed to the same amount of liquor and the reduction of the driving force in the case of increased spent liquor recycle.

The seedcharge is usually maintained at a level to obtain a desired particle size distribution coming out of the agglomeration section. This PSD is periodically measured and the seed charge is adjusted accordingly.

In case of shortage of seed the consequences are not too dramatic and temperature adjustment can bring the solution without much harm to the PSD of the hydrate but the attrition index and chemical quality may be deteriorated. The problem can be aggravated by upsets in the digestion ratio control, clarification mud washing, and calcination outages.

C. Crystal growth modifiers

Chemical additives are used by several plants to stabilize oxalate in liquor and to enhance agglomeration of fine seed in the agglomeration section of the precipitation department.

D. Hydrate toughening

Solids retention, precipitation holding time after agglomeration and product recycle are the most common methods to strengthen the fragile agglomerates to produce strong hydrate particles which can withstand the thermal and physical attrition in the calcination step. Various precipitation seeding routes are employed to give the product the required number of passes before being removed from the precipitation circuit as product.

As already indicated above, methods to increase the productivity of the Bayer process usually result in the production of a higher amount of fines.

A recent publication by Sang et. al. (Light Metals 1989, p. 33–39) proposes to dissolve the excess fine seed in the green liquor (or pregnant liquor) prior to feeding the precipitators.

The seed dissolution in green liquor as proposed by Sang et. al. has the disadvantage that relatively high temperatures have to be applied to dissolve the seed in the already highly supersaturated sodium aluminate liquor while this liquor has a high scaling tendency. At very high alumina concentrations in the liquor it will be almost impossible to further dissolve seed in the liquor.

SUMMARY OF THE INVENTION

To overcome the above problem it is now proposed to dissolve any excess of fines an spent liquor, rather than in pregnant liquor. This overcomes the above described problems.

The present invention, therefore, relates to a process for the precipitation of aluminum trihydroxide from a supersaturated sodium aluminate solution, comprising the steps of (a) supplying a stream of supersaturated sodium aluminate solution and a first stream of aluminum trihydroxide particles as seed particles to a first reaction circuit, (b) maintaining the sodium aluminate stream containing the stream of seed particles in the first reaction circuit under conditions mainly resulting in precipitation and agglomeration of aluminum trihydroxide, (c) passing the stream thus obtained to a second reaction circuit in which the stream is maintained under conditions mainly resulting in precipitation and growth of aluminum trihydroxide particles, (d) passing the stream obtained in the second reaction circuit to a separation/classification unit to separate the stream into a first aluminum trihydroxide product stream comprising the coarser particle size portion, a second aluminum trihydroxide product stream comprising the finer particle size portion and a spent liquor stream, (e) supplying a second stream of aluminum trihydroxide particles to spent liquor and dissolving at least part of the aluminum trihydroxide in the spent liquor and introducing the stream thus obtained into the sodium aluminate solution containing the first stream of aluminum trihydroxide particles in the first reaction circuit.

DETAILED DESCRIPTION OF THE INVENTION

Figure 1:
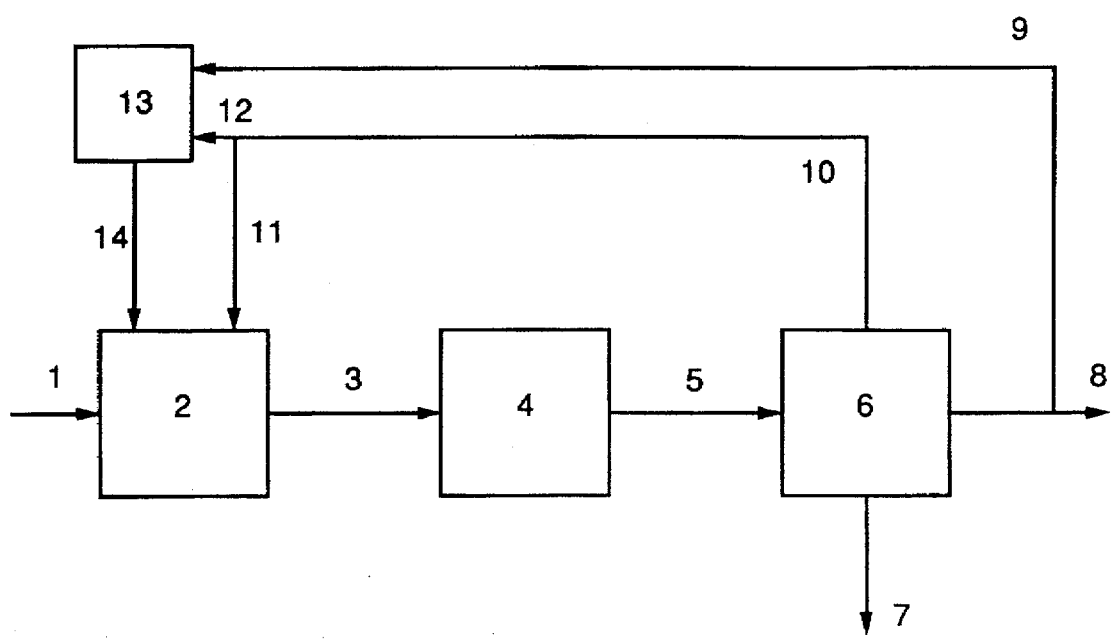
FIG. 1 is a schematic representation of the process of the present invention.

In a continuous Bayer process at least a part, usually the largest part, of the second aluminum trihydroxide product stream comprising the finer particle size portion as described in step (d) will be used as the first stream of aluminum trihydroxide particles, i.e. the seed fraction, as mentioned in step (a). However, a part may originate from another source, on a continuous base or on a batch base, e.g. from another Bayer plant, a bleed stream of the same Bayer plant or rejected product. Small amounts of spent liquor are often used to displace the seed particles. In the continuous Bayer process the part of the second aluminum trihydroxide product stream which is not used as the seed fraction of step (a) will be used as the second fraction of aluminum trihydroxide particles as mentioned in step (e). Also for this fraction other sources, as indicated above, may be used.

Preferably, the second aluminum trihydroxide product stream is divided into the first and second stream of aluminum trihydroxide particles only. It is further preferred that the second stream of aluminum trihydroxide particles comprises up to 20%, preferably up to 12% of the second aluminum trihydroxide product stream as mentioned in step (d).

In view of the excess seed production due to attempts to increase of the liquor productivity as already discussed before, it will be clear that the second stream of aluminum trihydroxide particles as mentioned in step (e) more or less concerns the excess seed production. In the case of higher productivity while keeping the conditions in the first reaction circuit the same (same amount of pregnant liquor, same amount of seed, temperature, ratio etc.), an increase in productivity will result in an excess of seed. Dissolving part of the seed in spent liquor in such a way that a solution is obtained comparable to the pregnant liquor, and using the non-dissolved part as seed for this solution, will result in an increased productivity of the precipitation stage, while the quality of the product will remain the same or almost the same. Therefore, it is preferred to dissolve such an amount of the second stream of aluminum trihydroxide particles in a certain amount of spent liquor that the A/C ratio of the solution obtained is the same as the A/C ratio of the pregnant liquor. Further, it is also preferred that the ratio of the amount of the solution obtained after dissolving part of second stream of aluminum trihydroxide particles and the amount of non-dissolved second stream aluminum trihydroxide particles is the same as the amount of pregnant liquor and the first stream of aluminum trihydroxide particles introduced into the first reaction circuit. If necessary, the spent liquor used in step (e) may be concentrated when the caustic concentration, due to for instance washings, is too low. Preferably the caustic concentration in the spent liquor to be used is the same as in the pregnant liquor. Usually between 5 and 50% of the second stream of aluminum trihydroxide particles is dissolved in the spent liquor, preferably 10 to 40%.

Part of the spent liquor obtained in step (d) is preferably used for the spent liquor stream mentioned in step (e). The supersaturated sodium aluminate solution as described in step (a) is preferably obtained by digesting bauxite using at least part, more preferably all but the amount used for step (e), of the spent liquor obtained in step (d).

The pregnant liquor used in step (a) preferably has a temperature between 65° and 90° C., preferably between 70° and 85° C., has a concentration between 100 and 400 grams/liter, preferably between 200 and 350 grams/liter, of total caustic, and an A/C ratio of 0.5 to 0.8, preferably of 0.6 to 0.75. The spent liquor obtained in step (d) preferably has a temperature between 40° and 65° C., preferably between 45° and 60° C., and an A/C ratio of 0.25 to 0.45, preferably 0.3 to 0.4.

It is preferred that the particles of the aluminum trihydroxide crystals of the first and second stream of aluminum trihydroxide particles have a median size between 25 and 60 micron, preferably between 30 and 55 micron, more preferably 35 and 50 micron.

It is further preferred that the first aluminum trihydroxide product stream comprises less than 25% by weight of product smaller than 45 micron, preferably less than 15%. This product stream is the coarse aluminum trihydroxide fraction which usually will be used for the production of calcined, anhydrous alumina.

The separation/classification step is carried out using techniques well known in the art, such as gravity sedimentation, elutriation, centrifugal separation by hydrocyclones, screening and sieving.

The temperature at which the second stream of aluminum trihydroxide particles is dissolved in the spent liquor fraction is suitably between 80° and 250° C., preferably between 100° and 220° C., more preferably between 120° and 180° C.

The invention is illustrated by FIG. 1. Pregnant liquor is fed via line (1) to the first reaction circuit (2), the agglomeration section, of the precipitation section. The reaction product made in this section is fed via line (3) to the second reaction circuit (4), the growth section, of the precipitation section. The reaction product obtained in this section is fed via line 5 to the separation/classification unit (6). Coarse precipitated product (the first aluminum trihydroxide product stream) is removed from the process via line (7). Spent liquor is removed via lines (8) and (9).

Fine seed (the second aluminum trihydroxide product stream) is fed via lines (10) and (11) to the first reaction circuit. Part of the fine seed is introduced via line (12), together with spent liquor via line (9), into digestor 13. After (partial) dissolution of the fine seed, the reaction product of this unit is introduced into the first reaction circuit (2) via line (14).

I claim:

1. A process for the precipitation of aluminum trihydroxide from a supersaturated sodium aluminate solution, consisting of the following steps
    (a) feeding a stream of supersaturated sodium aluminate solution and a first stream of aluminum trihydroxide particles as seed particles to a first reaction zone,
    (b) maintaining the sodium aluminate solution together with said seed particles in the first reaction zone under conditions resulting in precipitation and agglomeration of aluminum trihydroxide particles,
    (c) passing the product from step (b) to a second reaction zone and maintaining said product under conditions resulting in precipitation and growth of aluminum trihydroxide particles,
    (d) passing the product from step (c) to a separation/classification zone and separating said product of step (c) into a first aluminum trihydroxide product having a coarse particle size, a second aluminum trihydroxide product having a finer particle size and a spent liquor stream,
    (e) admixing a portion of said second aluminum trihydroxide product having a finer particle size with a portion of said spent liquor stream and dissolving at least a portion of the aluminum trihydroxide in the spent liquor and admixing the solution thus obtained with the saturated supersaturated aluminate solution of step (a) together with the remaining portion of said second aluminum trihydroxide product having a finer particle size.

2. A process according to claim 1, in which the supersaturated sodium aluminate solution of step (a) is obtained by digesting bauxite using at least portion of the spent liquor of step (d).

3. A process according to claim 2, in which the supersaturated sodium aluminate solution of step (a) is obtained by digesting bauxite using spent liquor obtained in step (d).

4. A process according to claim 1, in which the supersaturated sodium aluminate solution has a temperature between 65° and 90° C., has a concentration between 100 and 400 grams/liter, of total caustic, and an A/C ratio of 0.5 to 0.8.

5. A process according to claim 1, in which the spent liquor obtained in step (d) has a temperature between 40° and 65° C., and an A/C ratio of 0.25 to 0.45.

6. A process according to claim 1, in which said portion of said second aluminum trihydroxide product having a finer particle size which is admixed with said spent liquor stream in step (e) comprises up to 20% of the second aluminum trihydroxide product of step (d).

7. A process according to claim 1, in which the particles of the aluminum trihydroxide of the first and second aluminum trihydroxide products of step (d) have a median size between 30 and 55 microns.

8. A process according to claim 1, in which the first aluminum trihydroxide product comprises less than 25% by weight of product smaller than 45 microns.

9. A process according to claim 1, in which the amount of aluminum trihydroxide particles dissolved in said spent liquor and the amount of spent liquor is such that the A/C ratio of the solution obtained is the same as the A/C ratio of the pregnant liquor.

* * * * *